United States Patent [19]

Amor et al.

[11] Patent Number: 4,931,869
[45] Date of Patent: Jun. 5, 1990

[54] METHOD AND CIRCUIT ARRANGEMENT FOR REDUCING THE DATA RATE OF DIGITIZED IMAGES

[75] Inventors: Hamed Amor, Hildesheim; Hans-Dieter Lüke, Aachen, both of Fed. Rep. of Germany

[73] Assignee: Robert Bosch GmbH, Stuttgart, Fed. Rep. of Germany

[21] Appl. No.: 347,773

[22] PCT Filed: Nov. 24, 1987

[86] PCT No.: PCT/DE87/00509
§ 371 Date: Apr. 21, 1989
§ 102(e) Date: Apr. 21, 1989

[87] PCT Pub. No.: WO88/04508
PCT Pub. Date: Jun. 16, 1988

[30] Foreign Application Priority Data
Dec. 12, 1986 [DE] Fed. Rep. of Germany ....... 3642492

[51] Int. Cl.⁵ .............................................. A04N 7/133
[52] U.S. Cl. ..................... 358/133; 358/135; 358/136
[58] Field of Search ............... 358/133, 135, 136, 138

[56] References Cited

U.S. PATENT DOCUMENTS

| | | | |
|---|---|---|---|
| 4,581,638 | 4/1986 | Chiariglione | 358/135 |
| 4,672,441 | 6/1987 | Hoelzlwimmer | 358/135 |
| 4,704,628 | 11/1987 | Chen | 358/133 |

*Primary Examiner*—Howard W. Britton
*Attorney, Agent, or Firm*—Michael J. Striker

[57] ABSTRACT

For reducing the data rate of digitized images, image data are first transformed block by block, subsequently coded and finally temporarily stored in a buffer memory before they are output. Each data block is assigned on the basis of its own image statistics a classification code or factor from a collection of predetermined classes of different high-local resolution and the image data blocks are differently coded according to the class assigned to them. In order to prevent the buffer memory overflowing, a control variable is derived from the extent of the temporarily stored data, with which control variable the data extent of image data blocks is changed.

To prevent disturbing worsening of the local resolution of single or several image data blocks, the assignment of the classes to the image data blocks is changed depending on the control variable. In this manner, although fewer structures are resolved, these can be reconstructed with less error, which leads to a better subjective impression.

12 Claims, 1 Drawing Sheet

METHOD AND CIRCUIT ARRANGEMENT FOR REDUCING THE DATA RATE OF DIGITIZED IMAGES

BACKGROUND OF THE INVENTION

The invention relates to a method for reducing the data rate of digitized images, the image data of which are first transformed block by block, subsequently coded and finally stored temporarily before they are output, each image data block being assigned on the basis of its own image definition statistics to a classification factor from a collection of predetermined classes corresponding to different local resolutions and the image data blocks being coded according to the classes assigned to them, and a control variable being derived from the extent of the temporarily stored data, with which control variable the data extent of image data blocks is changed.

The processing and transmission of digitized images—the description below relates to television images as an example, whereby, however, also videotelephone, images for videoconferences etc. are included—offer several advantages in comparison with analog methods. For instance, during joint processing and transmission, several different signals may be better combined and separated, malfunctions can be more easily rectified and the signals can be processed and amplified intermediately without loss of quality even on a longish transmission route.

These advantages are offset by the disadvantage of the considerably higher transmission capacity in comparison with analog methods, which is understood to include, inter alia, a high bandwidth, bit rate and processing speed. The available transmission capacity, be it free frequency ranges in the case of radio transmission or free lines of the telecommunication network in the case of wire-based transmission, is however, limited, and would greatly restrict the number of transmission channels for digitized television images and be very costly for the users.

Application examples such as videotelephones or videoconferences require, on the other hand, an extensive network of transmission channels and low operating costs, so that enough subscribers see the acquisition as useful and justify setting up a network of this kind.

In order to fulfil these marginal conditions, methods have been developed for data reduction in which the data extent is controlled depending on the local image statistics. Since the average data extent is less than the maximum required for representing structures of high definition, a data reduction is thus achieved.

In a known method of this type, as is described in the research report "Kombinierte Quellen- und Kanalkodierung in adaptiven Transformations-Kodierungssystemen" (Combined Source and Channel Coding in Adaptive Transformation Coding Systems), Fortschrittsberichte VDI, No. 52, 1986, pages 74–117, the image data of digitized television images are first transformed block by block in a transformer circuit, subsequently coded in a coder and finally temporarily stored in a buffer memory before a serial output.

The coding is not the same for each image data block. Rather, each image data block is assigned a class code or a classification factor determined from its own image statistics and the image data blocks are then differently coded according to this assignment. In doing so, the coding is such that for the total image an extent of image data is obtained which, with temporary storage in the buffer memory, leads to the output of a data rate lying below a predetermined limit value.

This method functions properly as long as television images of originals of an average definition (i.e., richness in detail and contrasts) are to be transmitted. In the case of originals of high definition, on the other hand, there is the danger that the buffer memory will overflow, which would lead to far-reaching disturbances. In order to avoid this, in the known method a control variable is derived from the extent of the temporarily stored data and supplied to the coder. This then reduces the quantization resolution of the image data blocks just coded, so that the data stream flowing into the buffer memory becomes smaller than that output. This prevents overflowing.

However, this procedure would be disturbingly visible as a result of a sudden reduction of the local resolution in one or more image data blocks following image data blocks of high resolution. This phenomenon occurs even if, in the further course, the total image exhibits areas of structures of low definition which would lead to a reduction of the data stream anyway. In this case, too, a worsening of the image resolution would then occur in the known method.

SUMMARY OF THE INVENTION

The object of the invention is to improve a method for reducing the data rate of digitized television images in such a manner that, regardless of the definition of the input image data, a subjectively uniform image impression is achieved for the current total image and a constant output data rate is produced from the data extent of the image data blocks.

This object is achieved in the above described method in that the assignment of the classification factors to the respective image data blocks is changed depending on the control variable.

Since the classes are defined so that the transition from one class to another is not disturbingly noticeable due to a structure change in the total image, the assignment of the classes can also be utilized for a subjectively non-disturbing control of the data extent.

The invention enables television images of structures of low definition to be reproduced with an increased high-sensitivity resolution. The classes are controlled according to the data extent or volume of the image data blocks in such a manner that, viewed over the total image, a constant data rate is achieved and output. Thus, existing transmission channels can be utilized optimally and hence economically.

Particularly advantageous is a further development of the method in which the control variable is formed from the data extent of all image data blocks, that is to say from the total image. As a result of this, the high-sensitivity resolution of the image data blocks which follow areas with structures of high definition is not impaired by the current data extent of the previously coded image data blocks. Rather, it is then possible to code even very high-contrast originals in which structures of high definition alternate with structures of low definition with a data extent matched to the local resolution. This succeeds because the data extent is averaged over the total image and thus areas of low definition with their small data extent compensate for the large data extent of areas of high definition.

Further developments and advantageous embodiments of the method according to the invention are obtained in that exclusively the assignment of the classes to the data blocks is changed or, in addition, the quantization resolution during the coding of the image data blocks, is changed.

The invention furthermore relates to a circuit arrangement for reducing the data rate of digitized images which includes a series connection of a transformer circuit for transforming image data block by block, a coder, a buffer storage or memory and a feedback circuit connected between the buffer memory and the coder, and a classifier which, from the image data at the input of the transformer circuit and in dependency on image definition statistics of respective blocks at the output of the transformer circuit, assigns for the coder a specific classification factor to each data block.

In this respect, the object of the invention is to improve a circuit arrangement of this kind in such a manner that, regardless of the definition of the image data to be processed, a subjectively uniform image impression of the total image is achieved and a constant output data rate is produced.

The invention achieves this object with a circuit arrangement characterized in that the feedback current includes a control value generating unit for obtaining a control variable from the data temporarily stored in the buffer memory and the classifier changes the assignment of the classes to the image data blocks in dependency on the control variable.

The control variable obtained from the buffer memory activity represents a measure of the current state or also the average state of the buffer memory. The feedback is diverted to the coder via the classifier. In this manner, the data rate can be influenced by a changed assignment of the class to the individual data blocks.

Conversely, with television images from originals of low definition, the circuit arrangement enables the assignment of a class of higher local resolution. This regulation thus leads to an even output data rate and can be designed in such a manner that digitized television images of constant data rate are produced in all operating cases, be the originals of high definition or also of low definition.

BRIEF DESCRIPTION OF THE DRAWING

The invention will now be described with reference to an exemplary embodiment which is illustrated in the drawing, in which.

DESCRIPTION OF THE PREFERRED EMBODIMENTS

Figure 1:
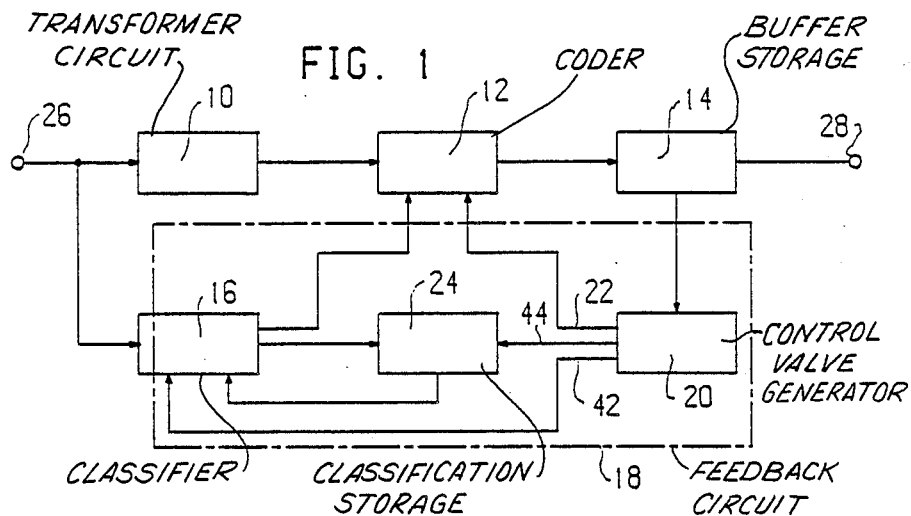
FIG. 1 shows a block circuit diagram of a circuit arrangement according to the invention.

Image data are supplied via an input terminal 26 to the circuit arrangement for reducing the data rate of digitized television images, shown in FIG. 1 as a block circuit diagram. The input image data first reach a transformer circuit 10, in which they are converted from an original range into a frequency range. A transformation of this kind can be performed according to various transformation algorithms. The discrete cosine transformation, however, has proved to be particularly suitable.

Figure 3:
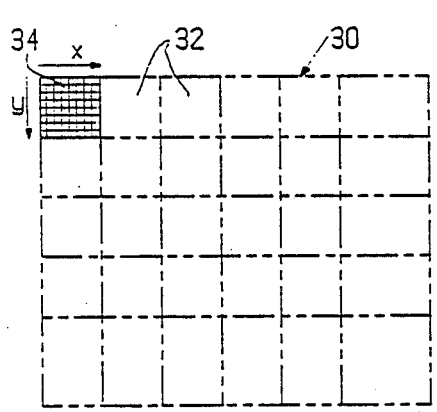
FIG. 3 shows a schematic representation of the image raster of a total image.

The television image is not transformed as a whole image matrix, but is divided into individual image data blocks which are transformed separately from one another. The division into image data blocks is illustrated in FIG. 3. This figure shows a section 30 of a total image which is divided into uniform square fields 32. Each field 32 in turn consists a number of image elements 34. In the exemplary embodiment, a field 32 consists of eight lines in the Y direction and eight columns in the X direction, a total therefore of 64 image elements. Other formats and numbers of image elements are possible, but a higher number of image elements requires more complex algorithms for their transformation. Since algorithms have been developed for the discrete cosine transformation which can be applied directly to rectangular image data blocks, this refinement of the method for performing the transformation is particularly suitable.

The output signals of the transformer circuit 10, which are spectral coefficients, are now processed further by a coder 12. The coder 12 comprises a quantization circuit and the actual coding circuit. First of all, the vector of the spectral coefficients is subjected to a block quantization. Then, in the coding circuit, the transformation blocks are processed in accordance with the available binary positions in such a manner that the quantization errors are kept to a minimum. The socalled threshold coding method can be used for the coding in such a manner that only such spectral coefficients are coded and transmitted whose value lies above a predetermined threshold. The advantage of this method lies in the fact that the different subjective sensitivity for the basic images can be included in the optimization of the coder.

For this purpose, the image data are evaluated in the original range by a classifier 16 and, if appropriate, after inclusion of the spectral range divided into various classes which take account of the local image structure.

Figure 4:
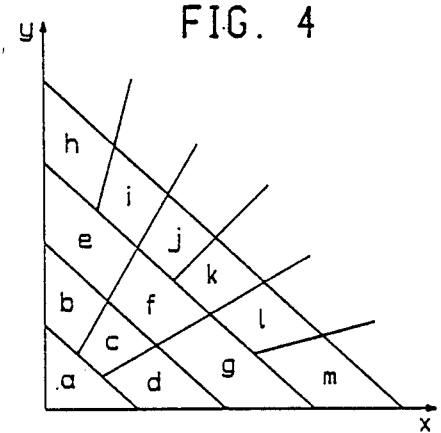
FIG. 4 shows a graphic representation of classes of various local resolutions.

A class division of this kind is illustrated in FIG. 4. If the image structures are of very low definition, then the class a is assigned. In the case of an image structure which shows more detail in the Y direction, the class b or e is assigned. If the definition is present both in the Y direction and in the X direction, then the class c is assigned. In this manner it is achieved that the main direction of the structures is taken into account. Accordingly, where an even higher resolution is desired, a further division of the classes is performed which depends on which privileged direction and which dimension the structure takes in.

The classifier 16 now controls, in accordance with the classification of the image data made, the coder 12 in such a manner that a code ensuring the highest subjective faithfulness of reproduction is used for coding. The data extent of the coded image data blocks varies according to the class assigned on the basis of the local image structure.

To adjust this discontinuous data stream to a constant data stream required for the transmission, the coded data are read into a buffer memory 14 and from there are led serially via an output terminal 28 to a transmission route. Under normal circumstances the buffer memory 14 evens out the fluctuating data flow. However, if the image has image structures of very high definition, an overflow of the buffer memory 14 may also arise.

Figure 2:
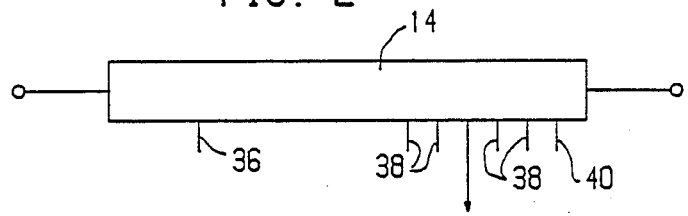
FIG. 2 shows a schematic representation of the buffer memory from FIG. 1.

The buffer memory 14 is shown separately in FIG. 2 and provided with marks 36, 38 and 40 which are to symbolize particular memory states. The mark 36 represents a stationary state which occurs under normal circumstances when the inflowing and outflowing data stream is the same. The marks 38 symbolize critical states which already require counter measures for reducting the incoming data stream. Finally, the mark 40 shows yet another state, at which the overflow of the buffer memory 14, associated with considerable image disturbances, is imminent.

In order to avoid an overflow of the buffer memory 14, when the memory state symbolized by the mark 38 is reached a reduction of the data extent of the incoming data stream is performed. This takes place via a feedback circuit 18, by means of which a control variable derived from the extent of the temporarily stored data is supplied to the coder 12.

In the feedback circuit 18 there is a control valve generating unit which monitors the memory state of the buffer memory 14. From the unit 20 a control line 42 leads to the classifier 16, in a further development of this embodiment a further control line 44 leads to a classification memory 24 and finally as a modified embodiment, a control line 22 leads directly to the coder 12.

If, because of an increased incoming data stream, the buffer memory 14 reaches a load state approaching one of the marks 38, the unit 20 generates a control signal for the classifier 16 such as to assign a lower class than would correspond to the image data in the original range, as they are supplied via the input terminal 26. Assuming that the classifier 16 would assign the class 1 to an image data block, then it is instructed by the control signal supplied via the control line 42 to assign the class g. If, in another example, it would assign the class f to an image data block, the unit 20 would instruct it to assign the class c.

In the case of the changeover of classes h, i, j, k, l and m to the correspondingly lower classes e, f, g, a high reduction of the data extent is achieved. In the case of the changeover of the class e to class b or even from the class b to class a, however, the data reduction is less. In this case it depends on the state of the buffer memory 14 whether a next-lower class is even to be selected. Preferably, in each case only one change by one class is made, the structure orientation being retained.

The classes are defined so that the changeover from one to another class due to a structure change in the total image is not subjectively noticeable as a disturbance. On the basis of this consideration, the mandatory change of the assignment of one of the classes to the image data blocks on the basis of the memory state is also not subjectively perceived as a disturbance. This is particularly the case in the changeover of the higher classes to the lower classes. Although fewer structures can be resolved here, these may be reconstructed however with a lesser error.

While the design of the feedback circuit 18 by the connection of the exclusive control valve generating unit 20 to the classifier 16 via the control line 42 already offers a high degree of protection from the buffer memory 14 overflowing, in addition a direct feedback by means of the control line 22 can also be provided. This direct feedback, known per se, leads to a reduction of the quantization resolution when the memory threatens to overflow, which leads to a worsening of the subjective image impression for the image data blocks concerned. This measure could serve as an additional safety measure to prevent the buffer memory 14 overflowing when the influencing characteristic via the classifier 16 has too small a control extent.

The circuit arrangement is also in the position, where an incoming data flow is too small, to increase the resolution of the image data blocks and thus contribute to maintaining the data flow constant and optimally utilizing the transmission path. If an image data block of an original of very low definition is assigned, for example, class b, and if the load state of the buffer memory 14 is below the mark 36, then the control valve generating unit 20 instructs the classifier 16 to assign a higher class, in this case e, to the corresponding image data block. If the class e had already been selected on the basis of the local image structure, then, depending on the main orientation of the structure, the class h or the class i can be assigned instead.

The control valve generating unit 20 is preferably designed so that it utilizes the entire data volume of a current image to estimate the data volume of a following image. Accordingly, the control of the classifier 16 can be controlled by the entire data volume instead of from the current data volume. Thus it is possible to avoid the allocations of other classes if it is clear that a following reduction of the data stream caused by the image contents without regulation measures would lead to the reduction of the memory state.

In further development of the invention, the classes are adjusted to the intensity of the subjective perception of an image. This takes account of the fact that the eye perceives finer structures in the centre of the image than at the image margins. Accordingly, if appropriate, the marginal areas are assigned lower classes and the centre of the image is assigned classes of higher local resolutions. As a result of this a further improvement of the subjective image impression is achieved at the same data rate. For better realization, the information of the classification of the current image, that means the classification factors of all image data blocks of a current total image is temporarily stored in a classification memory 24 and taken into account for the following image. The success of this measure lies in the fact that the individual image data blocks do not change fundamentally from one total image to another and thus the class assignment of the image data blocks can serve as a guide value for the following image.

We claim:

1. Method of reducing the data rate of digitized images, comprising the steps of transforming the incoming image data into blocks, subsequently coding the image data block by block, and storing the same temporarily before they are output, each image data block being assigned on the basis of its own image definition statistics to a classification factor selected from a collection of predetermined classes corresponding to different local resolutions and the consecutive image data blocks being coded according to the classes assigned to them; deriving from the extent of the temporary stored data control variable; and changing the data extent of image data blocks by changing the assignment of the classes to the respective image data blocks in dependency on the control variable.

2. Method according to claim 1 characterized in that only the assignment of the classes to the image data blocks is changed.

3. Method according to claim 1, wherein the transformed image data blocks are subjected to a block quantization, and in addition to a change of the quantization resolution during the coding of the image data blocks, the assignment of the classes to the image data blocks is changed.

4. Method according to claim 1, characterized in that the changed assignment of the classes is restricted to one of the respective adjacent classes of higher or lower resolution.

5. Method according to claim 1, characterized in that the control variable for the assignment of the classes to the image data blocks of the following total image is obtained from the data extent of all image data blocks of a current total image.

6. Method according to claim 5, characterized in that image data blocks associated with the image margins of the total image are coded so as to reduce the data extent.

7. Method according to claim 6, characterized in that the image data blocks associated with the image margins are assigned lower classes than the image data blocks assigned to the centre of the image.

8. Method according to claim 7, characterized in that the classification factors of the image data blocks of a current total image are temporarily stored and are taken into account when assigning the classes to the image data blocks of the following total image.

9. Circuit arrangement for reducing the data rate of digitized images, comprising: a series connection of a transformer circuit for transforming image data block by block, a coder for coding the consecutive image data blocks, a buffer memory for storing the coded image data, and a feedback circuit connected between the buffer memory and the coder; a classifier which, from the image data at the input of the transformer circuit and in dependency on image definition statistics of respective blocks at the output of the transformer circuit, assigns a specific classification factor to each data block; and the feedback circuit including a control value generating unit for obtaining a control variable from the data temporarily stored in the buffer memory, the control variable being applied to the coder via the classifier which changes the assignment of the classification factor to the image data blocks in dependency on the control variable.

10. Circuit arrangement according to claim 9, characterized in that the feedback circuit (18) leads only via the classifier (16).

11. Circuit arrangement according to claim 9, characterized in that, in addition to a direct feedback (22) to the coder (12), the feedback circuit (18) leads to the classifier (16) for changing the quantization resolution during coding of the image data blocks.

12. Circuit arrangement according to claim 9, characterized in that the feedback circuit (18) leads directly and additionally via a classification memory (24), which stores the classification factors of all image data blocks of a current total image, to the classifier.

* * * * *